US010752444B2

(12) United States Patent
Gray (10) Patent No.: US 10,752,444 B2
(45) Date of Patent: Aug. 25, 2020

(54) TRANSFER CHUTE TO MAINTAIN A DENSITY OF A FLOW OF GRANULAR MATERIAL

(71) Applicant: The University of Manchester, Manchester (GB)

(72) Inventor: John Mark Nicholas Timm Gray, Manchester (GB)

(73) Assignee: The University of Manchester, Manchester (GB)

( * ) Notice: Subject to any disclaimer, the term of this patent is extended or adjusted under 35 U.S.C. 154(b) by 0 days.

(21) Appl. No.: 16/321,234

(22) PCT Filed: Jul. 28, 2017

(86) PCT No.: PCT/GB2017/052216
§ 371 (c)(1),
(2) Date: Jan. 28, 2019

(87) PCT Pub. No.: WO2018/020268
PCT Pub. Date: Feb. 1, 2018

(65) Prior Publication Data
US 2019/0177090 A1 Jun. 13, 2019

(30) Foreign Application Priority Data

Jul. 28, 2016 (GB) .................................. 1613068.4

(51) Int. Cl.
*B65G 11/08* (2006.01)
*B65G 11/20* (2006.01)
(52) U.S. Cl.
CPC .................. *B65G 11/206* (2013.01)
(58) Field of Classification Search
CPC ........ B65G 11/08; B65G 11/20; B65G 11/206
(Continued)

(56) References Cited

U.S. PATENT DOCUMENTS 1,353,856 A * 9/1920 Schlunke ................ B07B 13/10
209/638
1,416,073 A * 5/1922 Steinbach ............ B65G 11/166
193/32
(Continued)

FOREIGN PATENT DOCUMENTS

DE 618313 C 9/1935
FR 2200168 A1 4/1974
(Continued)

OTHER PUBLICATIONS

GB 1613068.4 Search Report dated Jan. 6, 2017, 2 pages.
(Continued)

*Primary Examiner* — Douglas A Hess
(74) *Attorney, Agent, or Firm* — Linda B. Huber; Nixon Peabody LLP (57) ABSTRACT

The present invention relates to a transfer chute (100) for granular material, comprising a chute body defining a flow pathway (120) for granular material, a raised portion (110) having an inclined surface (111), and a splitter member (130) arranged proximal to the raised portion (110) for, in use, dividing a flow of granular material over the raised portion into first portion in first conduit (100) and a second portion in a second conduit (300). In some embodiments, a channel (150) is disposed between the first and second conduits (100; 300) to transpose a vertical arrangement of first and second portions of granular material within the chute (10). In this way, separation by particle size or density in the flow may be reversed.

15 Claims, 6 Drawing Sheets

(58) Field of Classification Search
USPC .................................. 193/2 R; 209/638, 641
See application file for complete search history.

(56) References Cited

U.S. PATENT DOCUMENTS

| | | | | | |
|---|---|---|---|---|---|
| 1,648,716 | A | * | 11/1927 | Henry | B07B 13/10 209/137 |
| 2,634,842 | A | | 4/1953 | Caylor et al. | |
| 3,895,982 | A | * | 7/1975 | Persson | B65G 11/166 156/71 |
| 4,274,527 | A | | 6/1981 | Baker | |
| 4,486,300 | A | * | 12/1984 | Prieb | B07B 4/02 141/286 |
| 4,490,247 | A | * | 12/1984 | Forsberg | B07B 4/02 209/135 |
| 4,772,380 | A | * | 9/1988 | Cramer | B07B 4/02 209/137 |
| 5,080,235 | A | * | 1/1992 | Nichols | B07B 13/11 209/638 |
| 5,271,506 | A | * | 12/1993 | Haines | B07B 13/10 209/637 |
| 5,403,141 | A | | 4/1995 | Rauser | |
| 5,518,102 | A | * | 5/1996 | Hershline | B07C 5/362 193/31 R |
| 5,669,511 | A | * | 9/1997 | Satake | B07C 5/02 198/638 |
| 5,791,489 | A | * | 8/1998 | Leifeld | B07C 5/344 209/44.1 |
| 5,791,493 | A | * | 8/1998 | Meyer | B07B 13/11 209/245 |
| 6,112,903 | A | * | 9/2000 | Kimmel | G01N 22/00 198/461.2 |
| 6,978,899 | B2 | * | 12/2005 | Kokko | B07B 4/04 209/639 |
| 7,866,484 | B2 | * | 1/2011 | Jaukkuri | B07B 4/08 209/432 |
| 8,662,314 | B2 | * | 3/2014 | Jones | B07C 5/363 209/44.2 |
| 8,708,157 | B2 | * | 4/2014 | Gibson | B07B 13/10 209/638 |
| 8,985,342 | B2 | * | 3/2015 | Tanaka | B07C 5/3425 209/639 |
| 9,309,052 | B2 | * | 4/2016 | Nolin | B65G 11/026 |
| 9,808,835 | B2 | * | 11/2017 | Yamaguchi | B07C 5/366 |

FOREIGN PATENT DOCUMENTS

| | | |
|---|---|---|
| GB | 919029 A | 2/1963 |
| GB | 1573820 | 8/1980 |
| GB | 2507707 A | 5/2014 |
| JP | H11301822 A | 11/1999 |
| JP | 2013-000684 A | 1/2013 |
| WO | 2018020268 A1 | 2/2018 |

OTHER PUBLICATIONS

International Search Report and Written Opinion of PCT/GB2017/052216, dated Nov. 8, 2017, 19 Pages.
GB 1613068.4 Search Report dated Feb. 27, 2017, 2 pages.
Viroulet, et al. Multiple solutions for granular flow over a smooth two-dimensional bump, J. Fluid Mech, 2017 vol. 815, pp. 77-116.

* cited by examiner

TRANSFER CHUTE TO MAINTAIN A DENSITY OF A FLOW OF GRANULAR MATERIAL

CROSS-REFERENCE TO RELATED APPLICATIONS

This application is a National Phase of International Application No. PCT/GB2017/052216 filed Jul. 28, 2017, which designated the U.S. and that International Application was published under PCT Article 21(2) in English. This application also includes a claim of priority under 35 U.S.C. § 119(a) and § 365(b) to British patent application No. GB 1613068.4 filed Jul. 28, 2016, the entirety of which is hereby incorporated by reference.

BACKGROUND

It is known to transfer granular materials, such as powders or other particulate materials, via means of a transfer chute. A transfer chute is an inclined pathway between an inlet and outlet, wherein the pathway may be enclosed along part or all of its length. The inlet may receive granular material from a delivery point or an output of a process and transfer the granular material to an input of another process or an output point.

Transfer of granular materials may be problematic. Problems may arise when the granular material is formed by grains, granules or particles having two or a plurality of different sizes and/or densities. Different sizes or densities of particles may separate whilst flowing down the transfer chute. Thus, at the outlet of the chute, the granular material is not formed by a uniform mixture of particle sizes i.e. the differently sized particles have separated within the chute. Generally larger particles rise upwardly in a flow of granular material. Similarly, particles of different density may separate within the chute with particles of lower density rising upwardly in the flow of the granular material. Problems may also arise in that a flow of granular material through a chute may become one or both of fast and dilute, which may produce dust and chute wear.

It is an object of embodiments of the invention to at least mitigate one or more of the problems of the prior art.

SUMMARY OF THE INVENTION

According to an aspect of the present invention, there is provided transfer chutes for granular material and methods of transferring granular material as defined by the appended claims.

According to an aspect of the present invention, there is provided a transfer chute for granular material, comprising a chute body defining a flow pathway for granular material, a raised portion having an inclined surface, and a splitter member arranged proximal to the raised portion for, in use, dividing a flow of granular material over the raised portion into first and second vertically disposed portions. In some embodiments, a conduit is disposed within the chute to transpose a vertical arrangement of first and second portions of granular material within the chute. In some embodiments, the inclined surface is inclined away from the inlet.

According to an aspect of the present invention, there is provided a transfer chute for granular material, comprising a chute body defining a flow pathway for granular material, a plurality of raised portions arranged within the chute for, in use, controlling a flow of granular material within the chute.

According to another aspect of the present invention, there is provided a transfer chute for granular material, comprising a chute body defining a flow pathway for granular material between an inlet and an outlet, wherein the flow pathway comprises a raised portion, said raised portion having an upper surface facing the inlet. In some embodiments the raised portion is arranged to, in use, form an upwardly directed jet of granular material within a portion of the chute body. According to another aspect of the present invention, there is provided a transfer chute for granular material, comprising a chute body defining a flow pathway for granular material between an inlet and an outlet, the chute body having first and second lateral side walls and a bottom surface, wherein said bottom surface comprises a plurality of raised portions between the first and second lateral sides. The raised portions may be arranged perpendicular to an elongate axis of the transfer chute.

According to a still further aspect of the present invention, there is provided a transfer chute for granular material, comprising a chute body defining a flow pathway for granular material between an inlet and an outlet, the chute body having first and second lateral side walls and a bottom surface, and a member arranged to extend into the chute to, in use, resist a flow of granular material within the chute. The member may be a splitter plate.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
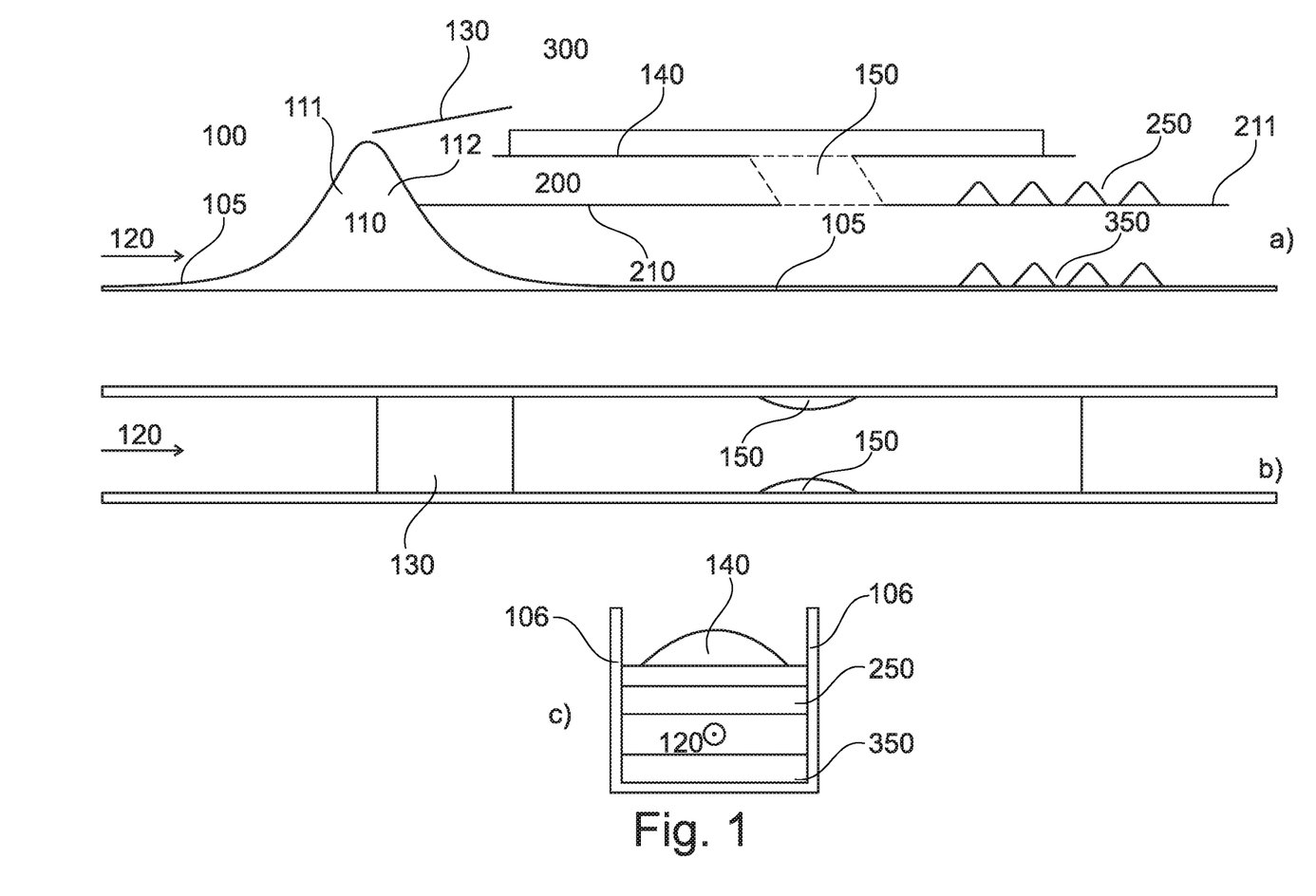
FIG. 1 shows a transfer chute according to an embodiment of the invention.

FIG. 1 illustrates a transfer chute, generally denoted as 100, according to an embodiment of the invention. FIG. 1(a) illustrates a longitudinal cross-section through the chute 100, FIG. 1(b) illustrates a top-down view of the chute 100 whilst FIG. 1(c) illustrates a lateral cross-section through the chute 100.

The transfer chute 100 includes a chute body which defines a flow pathway, as indicated by arrow 120 indicating a direction of flow, for granular material between an inlet and an outlet of the chute 100. The chute body has a bottom surface 105 first and second lateral side walls 106. Thus the chute may be U-shaped between the side walls 106, although it will also be appreciated that the chute may be enclosed by having a top surface in some embodiments. In use, the chute is inclined such that the outlet is lower than the inlet of the chute. The granular material flows under the influence of gravity, along the bottom surface 105 for at least a portion of the chute 100, as will be explained. In use the chute 100 is inclined in order to promote flow of the granular material between the inlet and the outlet of the chute 100. An angle of inclination may be between 30 and 50 degrees, or between 35 and 45 degrees, although it will be appreciated that other angles of inclination may be used.

The chute 100 comprises at least one raised portion 110 between the first and second lateral sides 106. As will be explained, in some embodiments two or more raised portions are provided along the direction of flow 120. In the embodiment shown in FIG. 1, a first raised portion is indicated as 110.

The illustrated raised portion 110, or flow control bump, is provided proximal to the inlet of the chute 100. The raised portion 110 comprises a first, or upstream, side 111 facing the inlet and a second, or downstream, side 112 facing the outlet. The first side 111 is inclined upward, away from the inlet. The raised portion 110 illustrated in FIG. 1 is generally symmetrical, however as will be shown asymmetric raised portions 110 are also envisaged. The raised portion in FIG. 1 has a shape similar to a normal or Gaussian distribution curve, although other shapes may be envisaged such as triangular as will be explained. The first side 111 may be linear or curved but is angled to locally reduce an angle of declination experienced by the granular material moving between the inlet and outlet of the chute 100. The raised portion 110 illustrated in FIG. 1 comprises an apex, or tip, representing a highest point of the raised portion 110. The apex separates the first and second sides 111, 112 of the raised portion 110 in some embodiments.

In some embodiments, the raised portion 110 is arranged to, in use, form a jet of granular material within the chute body. The jet may be upwardly directed. The jet is substantially detached, at a point downstream of the raised portion 110, from the bottom surface 105. It will be appreciated that in other embodiments the flow of granular material does not form a jet. In particular, in some embodiments a shock of granular material may instead be formed by the flow of granular material, as will be explained.

Figure 2:
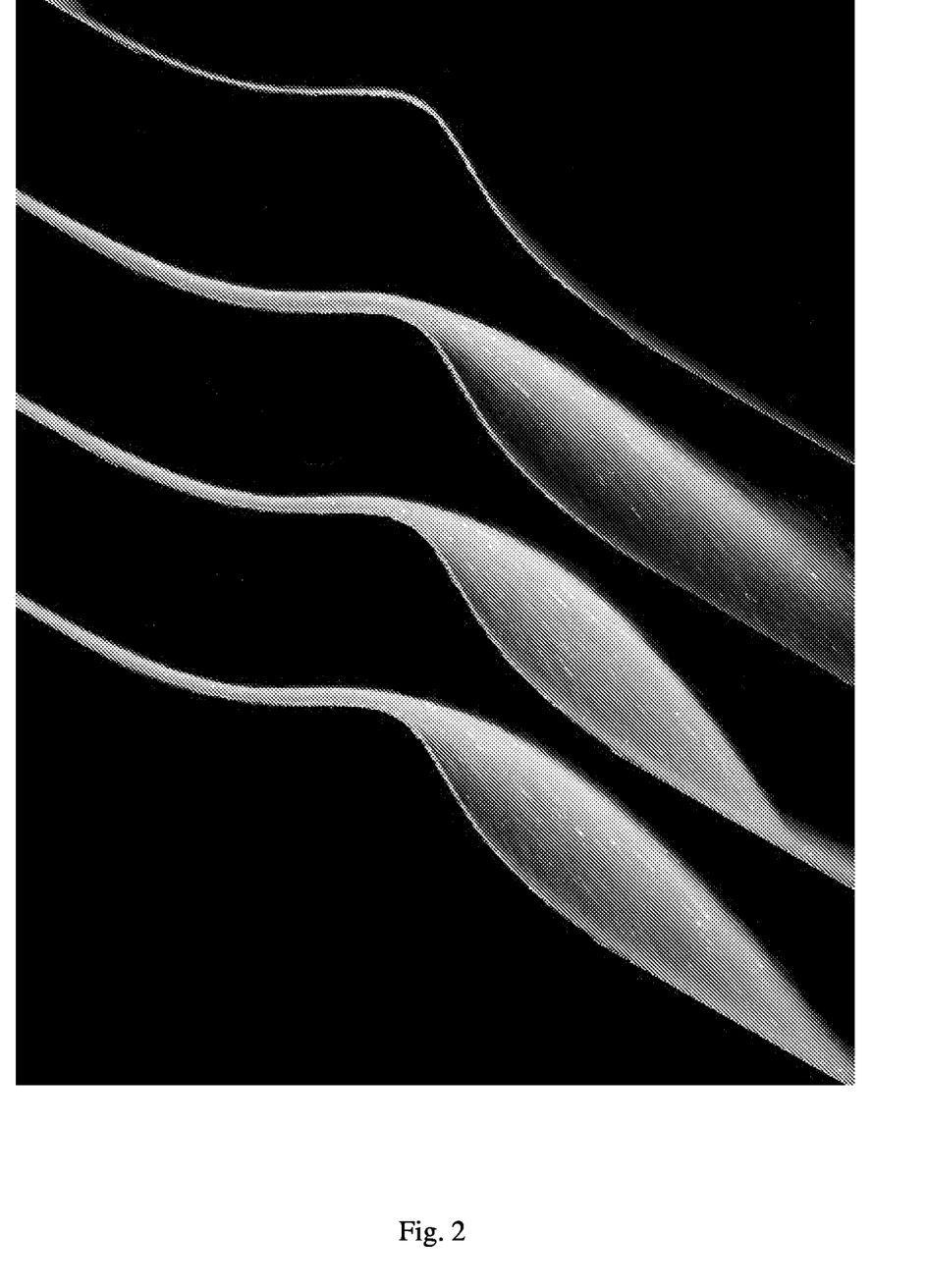
FIG. 2 shows a series of time lapse images of a jet of granular material formed according to an embodiment of the invention.

FIG. 2 is a series of images at different times of granular material flowing over the raised portion 110 with the chute inclined at an angle of 39°, although it will be appreciated that other inclinations may be used. The images are taken at times t=0.3, 0.6, 0.9 and 4 seconds as timed from opening a release gate to release the granular material. As can be appreciated, the jet of material is not established in the first (upper) image but can be seen to form during the sequence of images until, in the last (lower) image, a jet is established in a steady state. The jet of granular material detaches from the bottom surface 105 to follow a ballistic trajectory such that, in the steady state, the jet is generally not in contact with the downstream side 112 of the raised portion 110.

Referring again to FIG. 1, the chute 100 comprises a splitter member in the form of a splitter plate 130. The splitter plate 130 is a member arranged within the chute body proximal to the raised portion 110. The splitter plate 130 is arranged to separate the granular flow into at least first and second portions, wherein the first and second portions are vertically-divided (in a direction normal to the flow) components of the granular material over the raised portion 110. Whilst the flow in the example is split into two vertically-disposed portions, it will be appreciated that the flow may be divided into two or more portions, such as three or four.

The splitter plate 130 comprises a first end directed toward the inlet of the chute 100. The first end may be relatively thin i.e. in the form of an edge, in some embodiments similar to a knife edge. The first end of the splitter plate 130 may be vertically spaced apart from an upper surface of the raised portion 110. The first end may be located above the apex of the raised portion or downstream of the raised portion 110 and below a level of the apex of the raised portion. The first end of the splitter plate 130 is arranged to extend, in use, into the flow of granular material. The granular material is caused to divide by the splitter plate 130. A first portion of the granular material is communicated above the splitter plate 130 and a second portion of the granular material is communicated under, or below, the splitter plate 130. Thus the granular material at the raised portion 110 is divided into at least first and second portions. The first portion flows over the top surface of the splitter plate 130.

The first portion may comprise grains having a larger average size or lower density than the second portion of the granular material. The second portion comprises granular material proximal to an upper surface of the raised portion 110. The first portion comprises granular material disposed above the second portion.

Embodiments of the invention comprise at least one conduit disposed within the chute body. The at least one conduit is arranged to receive some of the portions of granular material, such as one of the first and second portions of the granular material. It will be appreciated that a respective conduit may be provided for each of the first and second portions of granular material. The one or more conduits are arranged to transpose i.e. reverse a vertical arrangement or ordering of the first and second portions. That is, in some embodiments, the first portion may be directed by a conduit to below a level of the second portion i.e. their vertical ordering swapped or reversed.

In one embodiment, the chute 100 comprises a conduit 200 disposed within the chute body to receive the second portion of the granular material. The conduit 200 is arranged to direct the second portion above the first portion within the chute body, whilst preventing mixing of the first and second portions of the granular material. In the embodiment illustrated in FIG. 1, the conduit 200 is formed between a first directing member 140 and a second directing member 210. The first and second directing members 140, 210 are arranged in spaced-apart relationship to form the conduit 200 there-between.

The second directing member 210 is disposed above i.e. separated from the bottom surface 105 of the chute 100 to form a path for the second portion of the granular material above, i.e. separated from, the bottom surface 105. In the embodiment in FIG. 1 the directing member 210 is parallel to the bottom surface 105 for a portion of the chute following the raised portion 110. The directing member 210 eventually terminates to direct the second portion toward the bottom surface 105. In some embodiments the second portion is allowed to fall toward the bottom surface 105, as will be explained. However other arrangements of directing the second portion are envisaged. An inlet end of the directing member 210 is proximal to the raised portion 110. In some embodiments, the inlet end touches, or is close to, the second side 112 of the raised portion 110. The inlet end of the directing member 210 is arranged such that substantially all the second portion of the granular material lands on top of the directing member 210 i.e. is prevented from reaching the bottom surface of the chute 100, such that the second portion travels a portion of the chute 110 spaced above from the bottom surface 105. The second directing member may be a plate or other elongate member arranged between the first and second sidewalls 106 of the chute 100 to act as a false-bottom for the second portion along a length of the chute 100 following the raised portion 110.

The first directing member 140 comprises an inlet end which is disposed further toward the outlet of the chute 100, in some embodiments, than the inlet end of the second directing member 210. Thus a path is formed into the conduit 200 for the second portion of the granular material subsequent to the raised member 110. The first directing member 140 is, in the embodiment illustrated in FIG. 1, parallel to the second directing member 210 within the chute 100. The first directing member 140 is arranged, in the embodiment of FIG. 1, at its inlet end, to be at a lower level than the outlet end of the splitter plate 130, such that the first portion of the granular material is received on top of the first directing member 140.

An upper surface of the first directing member 140 is arranged to direct the first portion of the granular material to one or more channels 150. The one or more channels 150 allow the first portion of granular material to be communicated to the bottom surface 105 of the chute 100. In the embodiment illustrated in FIG. 1, there are two channels 150 each arranged at a side of the chute 100. It will be appreciated that one or more channels 150 may be provided. Furthermore, at least some of the channels 150 may be arranged inwards from the sides of the chute 100. For example, a channel may be provided laterally between the sides of the chute 100. The upper surface of the first directing member is shaped to direct the first portion of granular material into the one or more channels. In the illustrated embodiment, the upper surface of the first directing member 140 is downwardly curved toward the sidewalls 106 of the chute 100. The upper surface of the first directing member 140 is convex along a lateral axis of the chute, such that granular material from the first portion falling onto the upper surface is directed toward the sidewalls of the chute corresponding to the location of the channels 150 adjacent each sidewall 106. As the first portion of granular material is received in each channel 150 it is directed downward to the bottom surface 105 of the chute 100 whilst bypassing i.e. avoiding contamination with the second portion of the granular material in the conduit 200. That is, the channels 150 are substantially sealed to allow the first portion of granular material to travel through the plane of the conduit 200 without the first and second portions mixing. The first portion, exiting the one or more channels 150, is allowed to fall to the bottom surface 105, whereupon the first portion continues toward the outlet of the chute 100. Once having exited the one or more channels 150 the first portion is disposed below the conduit 200 in which the second portion is communicated.

An outlet end 211 of the conduit 200, corresponding to an outlet end of the second directing member 210, is disposed above the bottom surface 105 as illustrated in FIG. 1. In the illustrated embodiment, the second portion of granular material is allowed to fall from the outlet end 211 of the second directing member 210 toward the bottom surface 105, along which the first portion is travelling. It will be appreciated that the conduit may otherwise direct the second portion onto the first portion.

Thus the second portion, having grains with a smaller average size and/or higher density than the first portion of the granular material, falls onto the first portion (having larger grains and/or smaller density) at the outlet end 211 of the second directing member 210. In this way, a vertical grain-size distribution of the granular material is reversed from that prior to the splitting. That is, immediately following the outlet end 211 of the second directing member 210, smaller and/or higher density grains of the granular material are generally disposed on top of larger and/or lower density grains of the granular material within the chute 100. As the granular material then flows further down a remainder of the chute the grains of granular material continue to segregate which generally attempts to reverse the grain distribution from that at the outlet end 211 of the second directing member 210. A relative location of the outlet end 211 and an end of the chute is chosen or determined, such that the further segregation of the granular material along the remainder of the chute assists in achieving an optimum i.e. well-mixed distribution of particle sizes and/or densities throughout the granular material. If the distance between the outlet end 211 and the end of the chute is too long, then excessive segregation will occur whereby the distributions are able to substantially reverse from that at the outlet end 211 i.e. where larger and/or less dense grains are generally at the top of the granular material flow.

Figure 3:
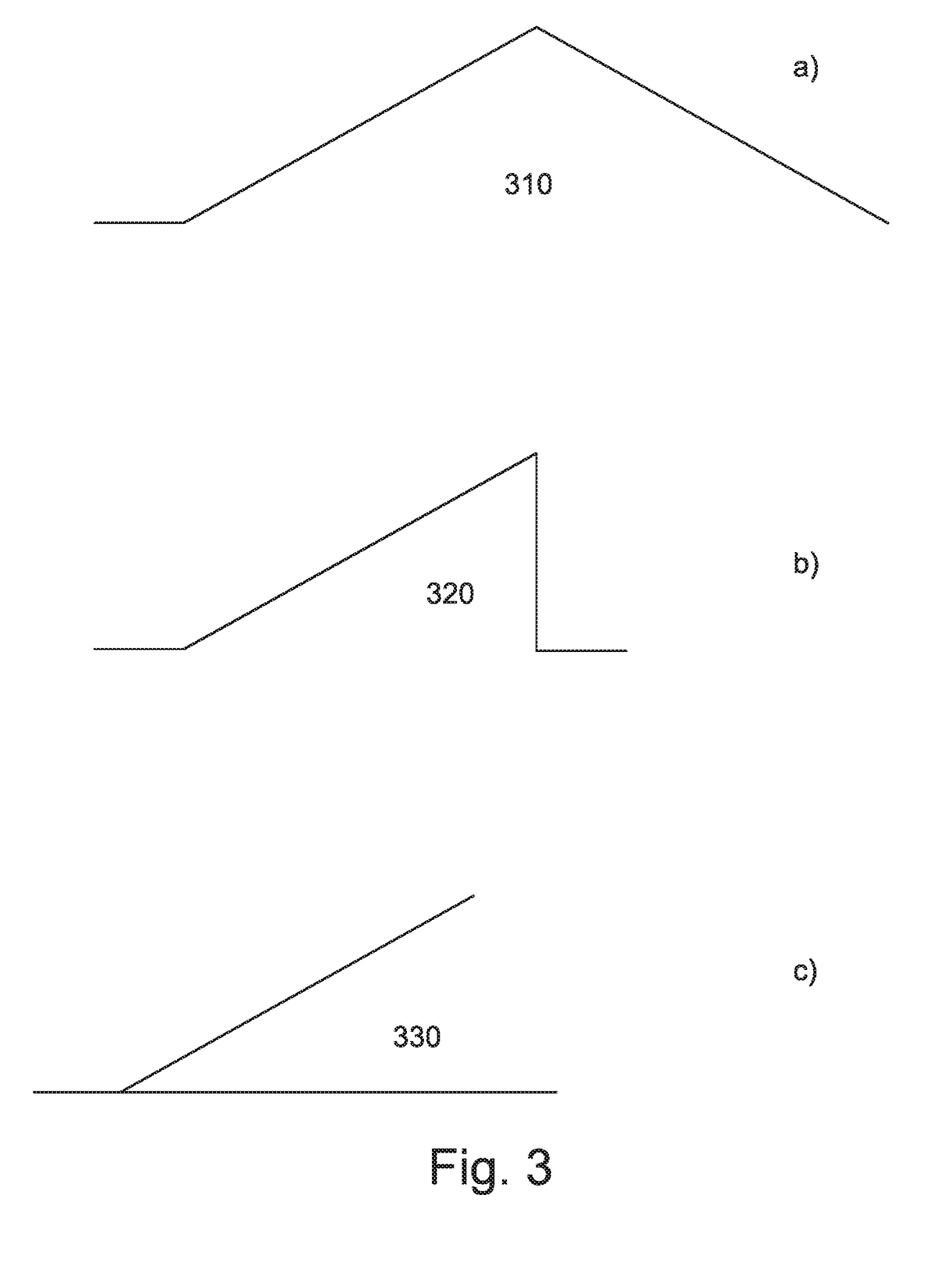
FIG. 3 shows a plurality of embodiments of raised portions according to embodiments of the invention.

FIG. 3 illustrates a plurality of raised portions 310, 320, 330 according to embodiments of the present invention. Each of the raised portions 310, 320, 330 illustrated in FIG. 3 has a different surface profile as will be appreciated. FIG. 3(a) illustrates a raised portion 310 according to an embodiment which, like the raised portion illustrated in FIG. 1, is symmetrical. The raised portion in FIG. 3(a) comprises first and second sides which are linear i.e. the raised portion has a triangular cross-section. The triangular cross-section may be equilateral or isosceles. FIG. 3(b) illustrates a raised portion 320 having a triangular cross-section in the form of a scalene triangle. FIG. 3(c) illustrates a raised portion 330 formed by a surface inclined with respect to the bottom surface of the chute. In other words, the raised portion 330 is formed by an elongate inclined member forming a surface to direct granular material. The raised portion 110, 310, 320, 330 may direct the granular material to form a jet or a shock. It will be appreciated that variants on the illustrated embodiments of the invention may be envisaged having curved surfaces as in FIG. 1. In some embodiments of the invention, the raised portion 110, 310, 320, 330 comprises an upwardly directed surface when the chute is arranged in a horizontal orientation, as shown in FIGS. 1 and 3. However in other embodiments the raised portion may be formed by non-linear or vertically-displaced portions of the bottom surface 105 of the chute. It will be understood that the raised portions shown in FIGS. 3(a), (b) and (c) are shown in the same orientation as used in FIG. 1(a), such that the inlet is on the left, with the flow of granular material travelling from left to right across the page. In this way, the first inclined surface in each of raised portions 310, 320, 330 is inclined away from the inlet.

Figure 4:
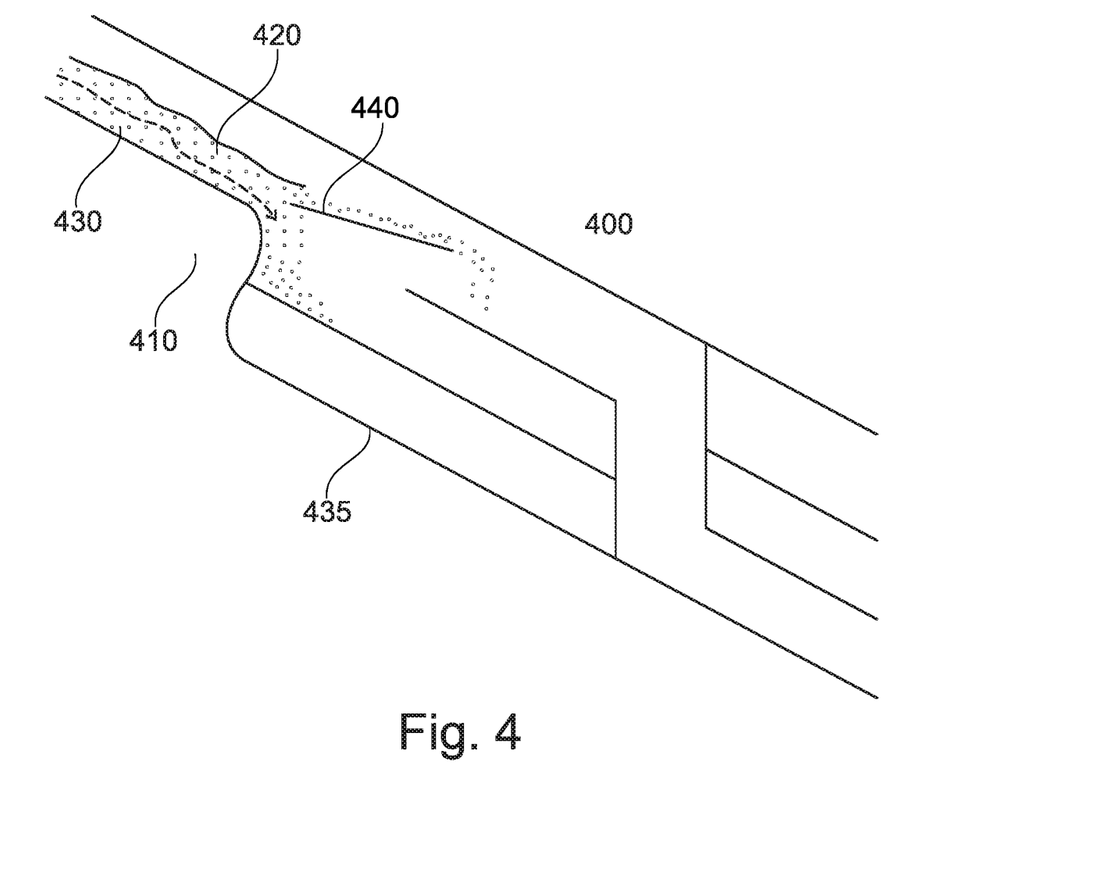
FIG. 4 shows a transfer chute according to another embodiment of the invention.

FIG. 4 illustrates a chute 400 arranged in use having granular material 420 flowing over a raised portion 410 to form a jet of granular material. In the embodiment illustrated in FIG. 4 the raised portion 410 is formed by a relative displacement of first 430 and second 435 portions of a bottom of the chute 400. The first portion 430 of the bottom of the chute 400 is not co-planar with the second portion 435 of the bottom of the chute 400. In the embodiment illustrated in FIG. 4 the second portion 435 is vertically-displaced from the first portion, such that the raised portion 410 is formed there-between. The raised portion 410 is formed by a downward step between the first 430 and second 435 portions of the chute bottom. In particular, the chute bottom steps-down by the second portion 435 being downwardly displaced from a plane of the first portion 430. Thus as the granular material 420 flows over the step the jet of granular material is thereby formed. As in the embodiment illustrated in FIG. 1 and described with reference there-to, the chute 400 comprises a splitter plate 440 arranged to divide the jet of granular material into at least two vertically-ordered components. The remainder of the chute 400 may be as described with reference to FIG. 1 and repetition will be avoided. It will be understood that the illustration of the granular elements in FIG. 4 is not intended to be indicative of the size or distribution of the particles.

Referring again to FIG. 1, in some embodiments the chute comprises first and second pluralities of raised portions 250, 350. Each plurality of raised portions 250, 350 is arranged sequentially along a surface within the chute 100. A plurality of raised portions will now be described, it being appreciated that the two pluralities illustrated in FIG. 1 may, in some embodiments, be identical, although differing pluralities of raised portions are also envisaged. It is also appreciated that the chute may not comprise a plurality of raised portions, or may comprise only one of the two pluralities of raised portions 250, 350.

As illustrated in FIG. 2, it is appreciated that a raised portion 110 within a chute is used to form a jet of granular material which, once a steady state is established, is temporarily detached from the surface on which the raised portion resides. However, it has been discovered by the present inventors that a raised portion may be arranged to control a flow of granular material within a chute. In particular, to control a speed of flow of the granular material within the chute. The flow is controlled by one or more raised portions forming a shock, as will be explained. The control of the flow may also, or alternatively, maintain a density of the flow. In some embodiments the control maintains a local thickness of the flow.

Figure 5:
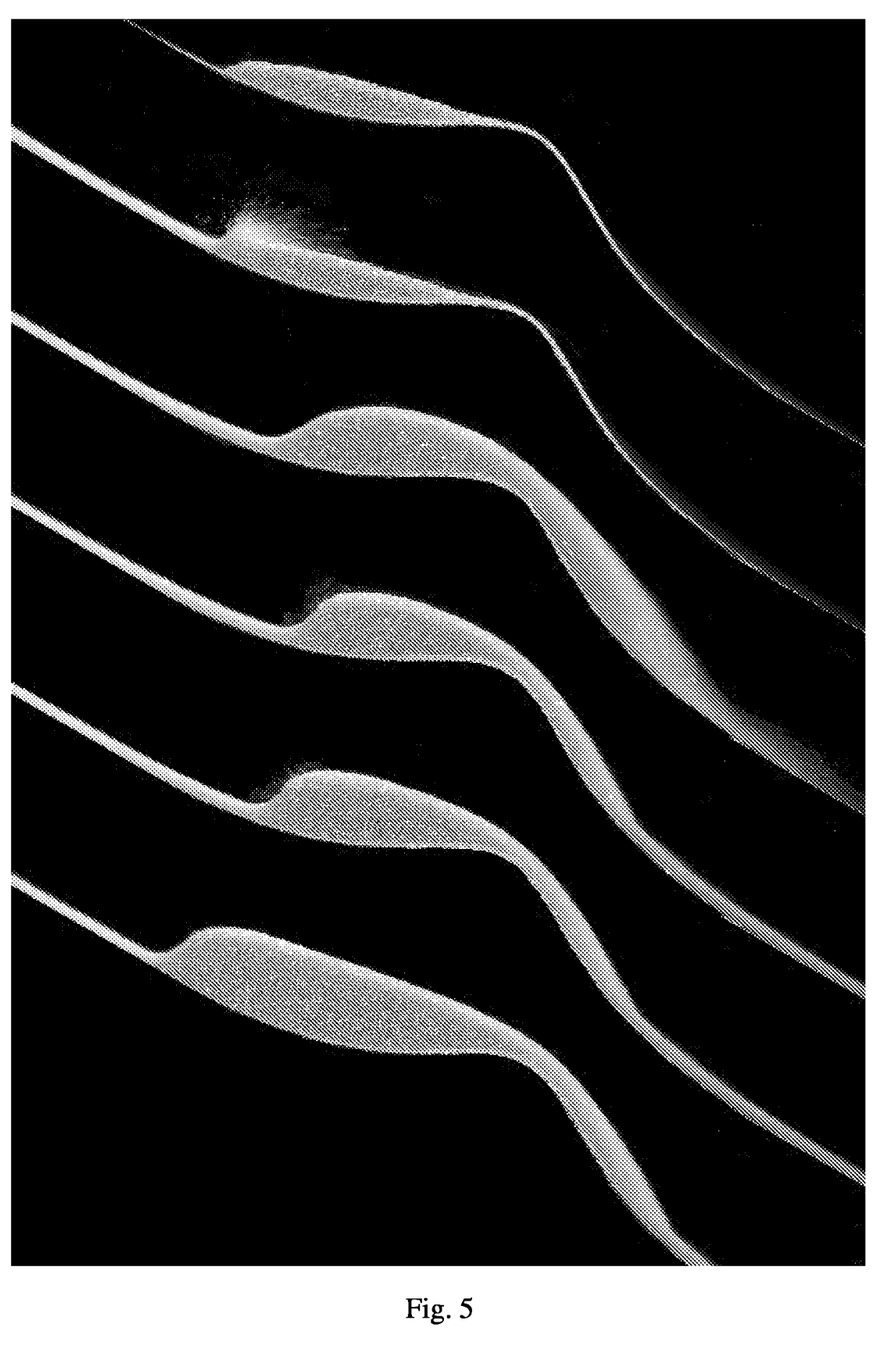
FIG. 5 shows a series of time lapse images of a shock of granular material formed according to an embodiment of the invention.

FIG. 5 is a series of images at different times of granular material flowing over a raised portion with the chute inclined at an angle of 39°, although it will be appreciated that other inclinations may be used. The images are taken at times at times t=0; 0.4; 0.7; 1.0; 1.5 and 4.0 s, as timed from opening a release gate to release the granular material. As the oncoming material from the inlet of the chute collides with a layer of static particles upstream of the raised portion, there is a sharp decrease in bulk velocity and associated increase in flow thickness. This shock propagates upstream until it reaches an equilibrium position, as illustrated in the last image in FIG. 5. The reason for the formation of either a jet or a shock of static material will now be explained with reference to various experiments.

Experiments were performed using a 1.8 m long smooth Perspex chute, inclined at an angle $\theta$ to the horizontal, with rigid sidewalls 5 cm apart. The base of the chute incorporates topographical gradients with a raised portion or 'bump' extending across the width of the channel, which may be described by a hyperbolic secant profile with maximum height 4.75 cm and its centre located 43 cm downstream of the inflow. The granular material used consists of spherical glass beads of diameter 600-800 μm. Grains are loaded into a hopper at the top of the chute and released from rest using a double gate system to control the initial flow thickness $h_0$. For all of the experiments presented here the gate height remains constant at $h_0=1.5$ cm; qualitatively similar behaviour has been observed when different values are used. Two different types of initial condition are implemented in experiments. In the first, the chute is cleared of all downstream particles before the gate is opened, so that the granular material flows down a smooth, empty channel. In the second, static particles (of the same type) are placed slightly upstream of the raised portion or bump, and the oncoming flow from the hopper then travels over a partially erodible bed. These different initial conditions evolve to two dramatically different stable steady-state regimes, which shall be referred to as the 'jet' and 'shock', as illustrated in FIGS. 2 and 4, respectively.

An initially empty chute usually leads to the formation of a jet of granular material. As soon as the gate is opened, the grains flow out of the hopper and accelerate downstream. For slope angles $\theta>35°$, they reach a sufficiently high velocity to detach from the base and become airborne as they flow over the bump, thereby forming the jet. Once the grains have passed this take-off point, they follow an approximate ballistic trajectory, before landing at a point downstream of the bump. A jet may still form when only a small mass of particles is placed in front i.e. upstream of the raised portion or bump. In this case, the oncoming granular material has enough momentum to entrain the erodible bed into the bulk flow, which then takes off as before. However, adding more static particles can lead to the formation of a steady shock upstream of the bump, as in FIG. 5, particularly in the lower images. When sufficient mass is added, the accelerating flow from the inlet hits the particles, scattering some material into the air but, more importantly, drastically decreasing the bulk velocity of the dense regime. To conserve mass flux, the thickness must consequently increase, which leads to a sharp transition in flow height, or shock, propagating upstream until it reaches a steady-state position. It is observed that this position remains stable to perturbations in the flow.

It has been observed that an initially empty chute leads to the formation of a jet, and a shock is then generated by temporarily placing a rigid obstacle into the path of the flow. After the flow has settled down to an equilibrium state, the flow is again obstructed downstream of the shock. This momentarily causes the shock to migrate upstream but, as soon as the obstacle is removed, it relaxes back to the steady state. Similarly, sweeping away small amounts of the slower moving material in the shock causes it to temporarily move downstream before returning to its original position. However, sweeping away a larger proportion of the shock material can lead to complete remobilization and transition back to the jet regime. When static particles are used to generate a steady shock, a critical mass of stationary material is required to sufficiently reduce the momentum of the flowing grains. This critical mass depends on the inclination angle of the chute. Several experiments have been performed with varying slope angles and mass of erodible particles to determine the necessary conditions for the formation of a steady shock. As expected, more particles are needed to generate a shock when the slope angle is higher. For slope angles lower than 34°, the flow never reaches fast enough speeds to pass over the raised portion or bump, and a shock is spontaneously generated even when there are no static particles. However, the shock does not reach a steady state and keeps propagating upwards until it reaches the gate. Contrastingly, for steep slopes $\theta>41°$, the friction on the smooth base is not sufficient to keep any particles placed in front of the obstacle at rest. They roll over the bump and a jet always forms. Assuming there are enough particles in front of the bump to create a shock in the first place, the position of the shock does not depend on the initial mass. Thus it can be appreciated that, depending upon conditions, a raised portion or bump within a chute can be used to form a jet of granular material, or a shock of granular material. It will be appreciated that the above-mentioned angle values for the slope are merely examples and that other slope inclinations may be chosen and that other experimental arrangements may lead to other slope angles.

As noted above, in order to generate a shock of granular material, a rigid or erodible obstacle may be temporarily placed into the path of the flow of granular material. However it has been found by the present inventors that a shock may be formed in a flow of granular material by a chute comprising two or more raised portions, such as those illustrated in FIGS. 1 and 3. The two or more raised portions are arranged sequentially i.e. adjacent in the chute. The two or more raised portions are arranged in close enough proximity to interact together with the granular flow. In some embodiments a first one of the plurality of raised portions is arranged to form a jet of the granular material which lands proximal to, or upon, a second one of the plurality of raised portions to thereby cause slowing in the flow of granular material. Some embodiments of the invention comprise two or more raised portions to form the shock of granular material. The two or more raised portions are arranged sufficiently close together within the chute that a jet of granular material from a first raised portion interacts with the second raised portion. In particular, in some embodiments, the second raised portion is sufficiently close to the first raised portion that the jet of granular material formed by the first raised portion lands close to, or on an inclined forward surface of the second raised portion. The second raised portion effectively slows the granular material sufficiently to form a shock of granular material on the second raised portion. The two or more raised portions may be used to control a speed of flow of granular material over the plurality of raised portions. In particular, the flow of granular material is caused to slow by passing over the plurality of raised portions. Each of the raised portions may be as illustrated in FIGS. 1 and 3.

As illustrated in FIG. 1, the first plurality of raised portions 250 may be present in a path of the second portion of granular material. The second plurality of raised portions may be present in a path of the first portion of granular material. The respective first and second plurality of raised portions control the flow of granular material by formation of one or more shocks of granular material, as described above. In some embodiments of the invention, one or more surfaces experienced by the granular flow may have an abrasive surface coating to assist in slowing the granular material, thereby assisting in shock formation. The abrasive-coated surface may be a surface of one or more raised portions and/or a surface of the chute.

Figure 6:
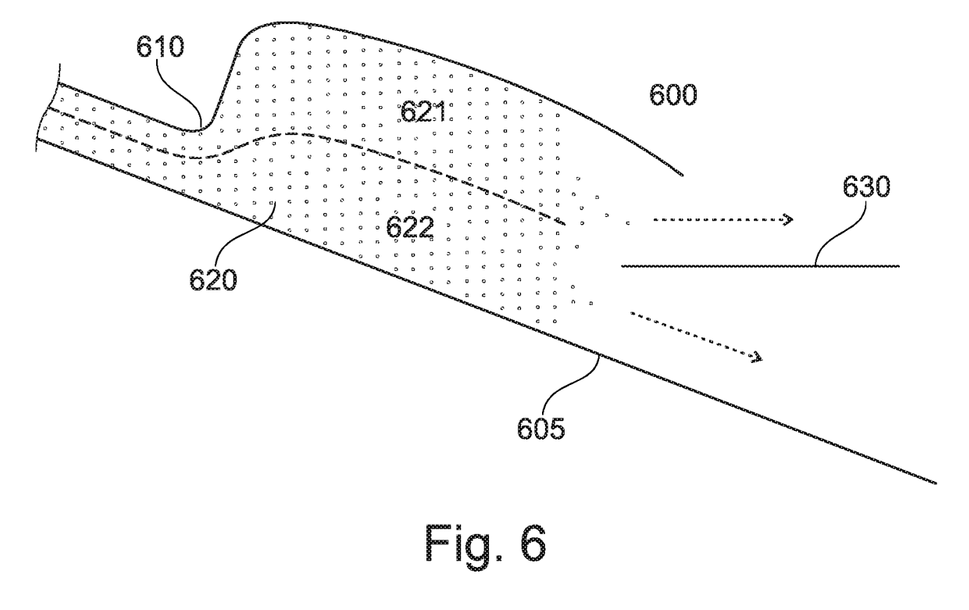
FIG. 6 shows a transfer chute according to another embodiment of the invention.

FIG. 6 illustrates a transfer chute 600 according to another embodiment of the invention. The transfer chute 600 is arranged in use having granular material 620 flowing down the chute 600. The granular material 620 is controlled to form a shock 610 i.e. an increase in flow thickness of the granular material 620. The shock 610 is portion of the granular flow 620 having a sharp decrease in bulk velocity and associated increase in flow thickness. As described above, a plurality of raised portions 250, 350 may be used, in some embodiments, to form the shock 610 in the flow of granular material 620 within the chute.

In the embodiment illustrated in FIG. 6, the shock 610 is formed by a member extending into the flow of granular material 620. The member, in the illustrated embodiment, is a splitter plate 630 which is arranged such that an end of the splitter plate 630 extends into the flow of granular material 620. As can be appreciated in FIG. 6, due to the flow of the granular material 620 down the chute 600, larger particles rise upwardly in the flow of granular material 620, as illustrated by division of regions 621, 622. The splitter plate 630 is arranged to form the shock 610 in the granular material 620. The splitter plate 630 may introduce some resistance to assist the flow of granular material 620 to form the shock 610. However in some embodiments the splitter plate 630 is arranged to introduce minimal resistance to the flow, such as by being relatively thin. A first portion 621 of the granular material is directed to a first side of the splitter plate 630 and a second portion 622 is directed to a second side of the splitter plate 630. The first portion 621 has an average larger grain size and/or lower density than the second portion 622. Following the splitter plate 630 an arrangement as illustrated in FIG. 1 may be used to reverse a vertical ordering of the first and second portions 621, 622 of the granular material to achieve a re-segregation and consequent mixing of grain sizes and/or densities within the granular material 620. It will be understood that the illustration of the granular elements in FIG. 6 is not intended to be indicative of the size or distribution of the particles.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A transfer chute for granular material, comprising:
   a chute body defining a flow pathway for granular material between an inlet and an outlet, the chute body having first and second lateral side walls and a bottom surface;
   wherein said bottom surface comprises a raised portion between the first and second lateral sides, said first raised portion having an inclined surface inclined away from the inlet;
   a splitter member arranged proximal to the raised portion for, in use, dividing a flow of granular material over the raised portion into first and second vertically disposed portions; and
   a conduit disposed within the chute body to receive one of the first and second portions of the granular material and to transpose a vertical arrangement of the first and second portions.

2. The transfer chute of claim 1, wherein:
   the conduit comprises a conduit inlet for receiving the one of the first and second portions of the granular material proximal to the raised portion.

3. The transfer chute of claim 1, wherein:
   the splitter member comprises a first end directed toward the inlet, the first end being arranged to extend, in use, into the flow of granular material such that a first portion of the granular material is communicated above the splitter member and a second portion of the granular material is communicated under the splitter member.

4. The transfer chute of claim 1, wherein the conduit is arranged to direct the second portion vertically above the first portion within the chute body whilst preventing mixing of the first and second portions of the granular material.

5. The transfer chute of claim 1, wherein a conduit outlet is arranged within the chute body to allow the second portion to exit the conduit above the first portion within the transfer chute.

6. The transfer chute of claim 5, wherein the second portion is caused to mix with the first portion within the chute body following exiting the conduit.

7. The transfer chute of claim 5, wherein the second portion is caused to fall onto the first portion within the chute body following exiting the conduit.

8. The transfer chute of claim 5, wherein the conduit outlet is located between the raised portion and the outlet.

9. The transfer chute of claim 1, wherein said bottom surface comprises second and third raised portions between the first and second lateral sides and wherein the second and third raised portions are arranged for controlling a flow of at least a portion of the granular material.

10. The transfer chute of claim 9, wherein the second and third raised portions are located such that a jet of granular material from the second raised portion interacts with the third raised portion.

11. The transfer chute of claim 9, wherein the third raised portion is located such that the jet of granular material from the second raised portion lands proximal to the third raised portion.

12. The transfer chute of claim 1, comprising a plurality of raised portions in proximity such that, in use, a shock of granular material is formed to control the flow of granular material.

13. A method of transferring granular material, comprising
flowing granular material into a chute defining a flow pathway for granular material between an inlet and an outlet, the chute having first and second lateral side walls and a bottom surface;
directing a flow of granular material over an inclined surface of a raised portion within the chute, wherein said bottom surface comprises the raised portion;
splitting the flow of granular material into first and second vertically disposed portions; and
transposing the vertical disposition of the first and second portions within the chute.

14. A transfer chute for granular material, comprising:
a chute body defining a flow pathway for granular material between an inlet and an outlet, the chute body having first and second lateral side walls and a bottom surface;
wherein said bottom surface comprises a plurality of raised portions, each of the raised portions having an inclined surface inclined away from the inlet, said plurality of raised portions being arranged to, in use, control a flow of granular material within the chute; and
wherein said plurality of raised portions comprises first and second raised portions;
wherein the second raised portion is located such that a jet of granular material from the first raised portion lands proximal to the second raised portion; and
wherein the second raised portion is located adjacent to the first raised portion such that, in use, a shock of granular material is formed on at least one of the first and second raised portions.

15. A method of transferring granular material, comprising
flowing granular material into a chute defining a flow pathway for granular material between an inlet and an outlet, the chute having first and second lateral side walls and a bottom surface;
directing a flow of granular material over plurality of raised portions with the chute to control the flow of granular material, wherein said plurality of raised portions comprises first and second raised portions, wherein the second raised portion is located such that a jet of granular material from the first raised portion lands proximal to the second raised portion, and
wherein the second raised portion is located adjacent to the first raised portion such that, in use, a shock of granular material is formed on at least one of the first and second raised portions.

* * * * *